Aug. 25, 1964  J. B. TURNER  3,145,755
WHEEL AND RIM CONSTRUCTION
Filed May 22, 1961
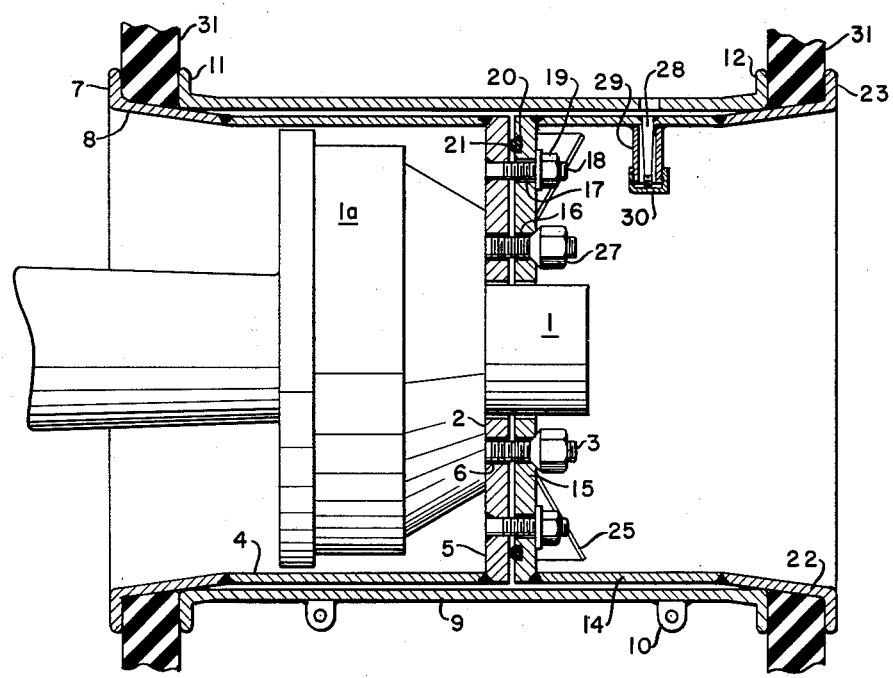
FIG. I
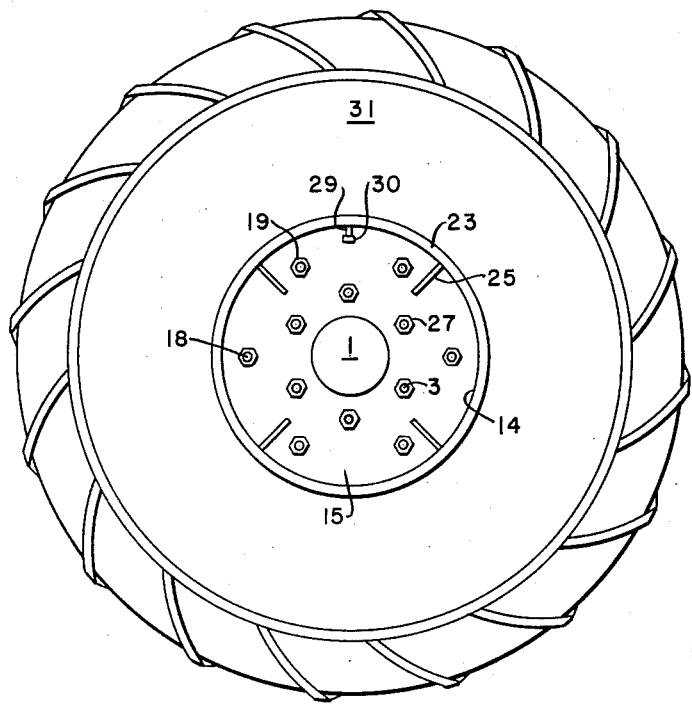
FIG. II
INVENTOR:
J. B. TURNER
BY: *H. D. Burich*
HIS ATTORNEY United States Patent Office 3,145,755
Patented Aug. 25, 1964

3,145,755
WHEEL AND RIM CONSTRUCTION
James B. Turner, Houston, Tex., assignor to Shell Oil Company, New York, N.Y., a corporation of Delaware
Filed May 22, 1961, Ser. No. 111,641
2 Claims. (Cl. 152—401)

This invention relates to a wheel and rim for use with pneumatic tires of the tubeless type and is more particularly concerned with a wheel and rim construction for use with low pressure balloon tires having a considerable ground contact and of large dimensions.

It is a common practice when vehicles are used in soft marshy ground and, in general, for off the highway use, to employ tires of substantially larger size than would be used on roads. Such special tires have been developed by various tire manufacturing companies. By the use of these tires it is possible for vehicles to traverse terrain such as bogs, marshes, tundra and the like where it has been heretofore impossible to take wheeled vehicles. Furthermore, vehicles equipped with such tires can in many cases ford streams and other waterways by reason of the buoyancy provided by the large gas-filled tires. An example of such tires is the "Terra Tire" manufactured by the Goodyear Tire and Rubber Company of Akron, Ohio. One model of such tires has dimensions of 46" x 24"—16R and has a ground contacting area of about 624 sq. in. These types of tires are particularly useful for use on vehicles used by exploration parties such as surveyors and geologists. By their use, progress can be continued in spite of muddy ground. The use of the large low pressure tires substantially decreases the imprint in the soil by the vehicles so that damage to farm land due to passage of the vehicle is greatly reduced.

One problem with the use of such oversize, low pressure tires is that the width of the vehicle is so increased by their installation that the legal limits for highway use are exceeded. As a result, it has been necessary, when operating these vehicles on highways, such as for example when going to or coming from an exploration area, to obtain special permits from the highway authority having jurisdiction. The obtaining of such permits is sometimes difficult and is time-consuming. In the event that such permission is not obtainable then the oversize tires and their special wheels have to be removed and replaced with conventional tires and wheels before the vehicle can be operated on the highway. Such removal requires considerable expenditure of time and effort by the personnel. It is, therefore, an object of this invention to devise a means whereby oversize, low-pressure tires may be mounted on vehicles so that the width of the vehicle stays within legal highway limits.

Another object of the invention is to provide a wheel and rim construction of simple and economic design which provides improved support for oversize, low pressure tires for use on both highway and roadless tracts, such as marshes and bogs.

The further objects of this invention will be seen from the following detailed description of one embodiment of the invention in which reference is made to the accompanying drawing in which:

FIG. I is a side view of the wheel and rim assembled in section on a hub, not in section.

FIG. II is a front view of the wheel and rim assembled on a hub and with a low pressure tire of the type mentioned mounted in place.

Referring to the figures, 1 represents the normal heavy duty wheel hub of a vehicle such as an exploration party truck having an outward facing flange 2 on which are mounted a series of wheel attaching studs 3 parallel and circumferential to the horizontal axis on which the hub turns. A steel tubular wheel portion or first spool 4 having an end plate 5 is provided with apertures 6 so placed that upon the spool being slipped over the wheel hub 1 and axially located therewith, the studs 3 on the hub will pass through each of the circumferentially placed apertures 6 of the flange 5. In this position, as shown in FIG. I, the end plate 5 lies adjacent the flange 2 of the hub 1. The innermost end of the spool 4, that is the end of the spool closest to the center line of the vehicle, is provided with an outward turned flange 7. The cylindrical surface of the spool 4 is provided with a slight tapered area 8 (for example, 5 degrees of taper has proven satisfactory). The taper is toward the plate 5 and extends from the flange 7 for a distance exceeding the width of the tire bead of the tire to be accommodated. A rim 9 consisting of three or more segments is provided. The segments have multiple tab pieces 10 at their aligning edges so that the segments can be readily bolted together to form an assembled rim. The rim 9 is provided with outwardly directed flanges 11 and 12 at its ends. As will be seen, the rim 9 fits over the spool 4 for a substantial part of its width and makes contact along the tapered portion to which it closely fits. A second spool 14 having matching end plate 15 to the end plate 5 on the spool 4 is aligned with the hub and apertures 16 therein are so placed as to fit over the studs 3 of the hub. The end plate 15 has a series of apertures 17 close to its periphery. Studs 18 in the end plate 5 of spool 4 are aligned with said apertures 17 and with nuts 19 serve to hold two end plates tightly together. A circumferential groove 20 in the end plate 15 of the second spool 14 is provided with a rubber O-ring gasket 21. This gasket is so located that it tightly seats on the opposite flange forming a circular airtight joint therewith. The surface of the spool 14 is provided with a slight tapered area 22 similar to that of the first spool 4 and for the same purposes. Steel gusset plates 25, suitably spaced, are welded between the cylindrical portion of the spool and the end plate 15. The two spools 4 and 14 with the rim in place thereover are held concentric to the hub by means of nuts 27 screwed onto the wheel studs 3.

A one way tire air valve of standard type 28 is threaded into or otherwise fastened airtight to the second spool so that its inlet end is towards the hub. A protecting sleeve 29 with screw threaded cap 30 is provided to protect the valve.

The assembly of the rim and wheel is relatively simple and is accomplished as follows:

The first spool 4 is slid over the hub 1 and its normally associated brake drum 1a and the apertures 6 in the end flange lined up so as to allow the studs 3 on the hub to pass through. Two nuts 27 are preferably temporarily screwed onto two of the studs 3. Next, the rim 9 is assembled by bolting together the segments inside the tire beads and the rim and the tire together slid over the spool 4. The bead of one side of the low pressure tire is then pushed into place against the outward turned flange 7 on the spool 4. When in place the outward turned flange 11 of the rim forms one side of a clamp holding one bead of the tire. The two nuts temporarily holding the parts together on the hub can now be removed. The second spool 14 is next fitted over the studs 3 and the outer fastening means 18 and 19 for sealing the two spools together made up. In the drawing, studs 18 and nuts 18 are shown for this purpose as this enables the wheel to be more easily assemblied while using the hub as a jig. However, bolts and nuts could be used for holding the two spools one to the other, if desired.

The end plate 15 of the spool 14 is carefully aligned with the end plate 5 of the spool 4 and tightened to it making certain that the rubber gasket 21 is properly seated so as to ensure an airtight seal between the two opposed faces of the end plates. At the same time the second bead of the tire is clamped between the outward turned flange 12 of the rim 9 and the outward turned flange 23 of the second spool 14. Air is forced into the tire from a source of compressed air by connecting an air hose to the valve 28 until the desired pressure, for example, 4–10 lbs. per sq. in., is reached. As will be seen, the cylindrical rim 9 is not itself airtight having one or more holes through its cylindrical face. However, the combination of the spools 4 and 14, rim 9 and tire 31 form an airtight annular structure by reason of the rubber gasket 21 between the two end faces 5 and 15 of the spools 4 and 14. As a variation of the form of wheel construction described above, I may provide a first or inner spool which is substantially longer than the second or outer spool. In such case the attaching flange would be approximately centrally located therein and air sealing circumferential flanges provided on the edges of the two spools. The flanges being fastened together by several equally spaced connectors.

It will be seen that by the invention herein described, a structure is provided which permits the mounting of the tire over the brake drum so that the load is transmitted from the center of the wheel to the brake drum flange. This results in the width of the vehicle tread being within the eight foot legal limit, easier steering of the vehicle, and less strain on the steering gear. These advantages permit more effective use of equipment particularly by such parties as seismic exploration crews in the field. Such crews will have less inactive time because of bad weather or natural conditions whereby the ground is too soft for travel by standard vehicles. They will have less refusals for permits by landowners who do not want ruts across their property. The also have the advantage over other vehicles equipped with large low pressure tires because they do not require permits for highway travel or require disassembly to pass gates to gain access to private property.

I claim as my invention:

1. A vehicle wheel assembly for low pressure tires comprising:
   a first wheel spool having an inner flange at one end, the outer portion of said wheel spool at the other end tapering radially outwardly and terminating in an outer flange;
   a second wheel spool having an inner flange at one end, the outer portion of said wheel spool at the other end tapering radially outwardly and terminating in an outer flange;
   said wheel spools having the said inner flanges secured together so that said tapered portions are positioned outwardly from the mating inner flange faces of said spools, the distance between said outer flanges when said wheel spools are secured together being substantially greater than the inner diameter of said wheel spools;
   a flanged cylindrical rim of uniform diameter comprising a plurality of rigid segments held in position on said wheel spools solely by contact with the outward tapered portions of said wheel spools, each of said rigid segments being firmly bolted one to the other.

2. A vehicle wheel assembly as defined in claim 1 wherein the segments of the flanged cylindrical rim are provided with bolting tab pieces.

References Cited in the file of this patent

UNITED STATES PATENTS

| | | |
|---|---|---|
| 1,164,963 | Schweinert | Dec. 21, 1915 |
| 1,289,500 | McKay | Dec. 31, 1918 |
| 2,367,828 | Brink | Jan. 23, 1945 |
| 2,440,740 | Daddio | May 4, 1948 |
| 2,576,736 | Watkins | Nov. 27, 1951 |
| 2,697,252 | Clark | Dec. 21, 1954 |
| 2,989,108 | Gore | June 20, 1961 |

FOREIGN PATENTS

| | | |
|---|---|---|
| 119,441 | Russia | 1959 |